Nov. 23, 1965  R. A. GERG ETAL  3,219,887
ELECTRICAL BUS STRUCTURE FOR MOTOR CONTROL CENTER
Filed Aug. 7, 1963
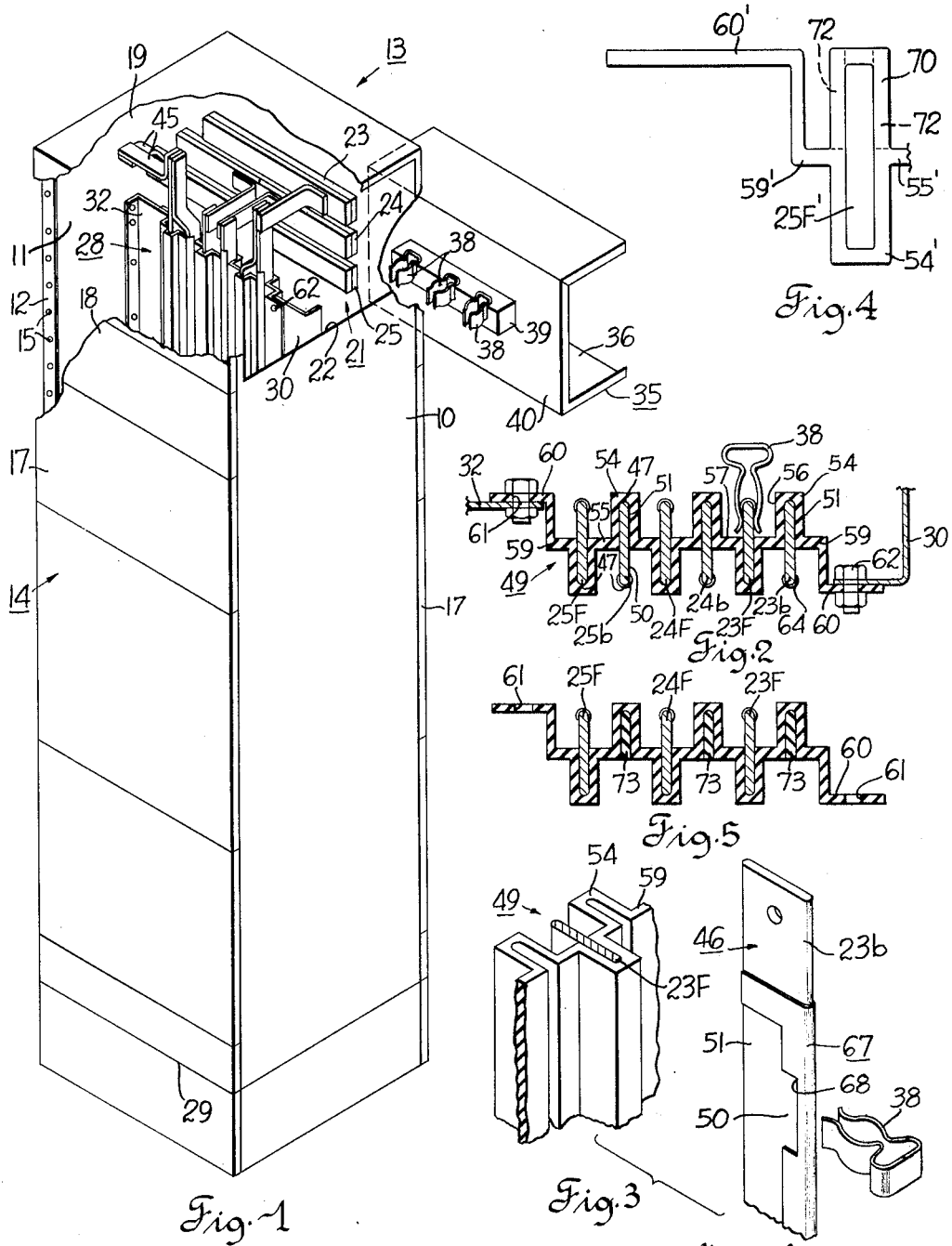
Inventors
Robert A. Gerg
Gregory F. Turner
By W. Robertson
Attorney

United States Patent Office 3,219,887
Patented Nov. 23, 1965

3,219,887
ELECTRICAL BUS STRUCTURE FOR MOTOR CONTROL CENTER
Robert A. Gerg and Gregory F. Turner, Brookfield, Wis., assignors to Allis-Chalmers Manufacturing Company, Milwaukee, Wis.
Filed Aug. 7, 1963, Ser. No. 300,512
7 Claims. (Cl. 317—103)

This invention relates generally to an electrical bus structure, more specifically to a bus structure that is insulated to protect people working near the bus but is partly open to have removable electrical apparatus connected to it.

The bus structure of this invention is particularly intended for a motor control center. The motor control center is a metal enclosed vertical tier of removable, drawerlike compartments that each hold starters, circuit breakers, and related apparatus for motors that are located away from the motor control center. The control center has a vertically extending three phase bus and each drawer has three connectors called "stabs" that engage the three bus bars when the drawer is in place. Other flexible conductors lead from the control apparatus in the drawers to the motor.

Because the control centers are made to receive drawers of various standard heights, the vertical bus structure usually runs about the full height of the control center without any insulation except for a few supports that hold the bus bars. The exposed bus bars can be dangerous to service personnel who may reach inside the control center when a drawer is removed. One object of this invention is to provide a new and improved bus structure that is insulated enough to protect the people working in the control center but is open enough for the stabs on the drawers to contact the bus bars.

Sometimes control centers have two tiers of drawers arranged back to back around a common vertical bus structure to plug in to the same bus structure from opposite sides. To supply twice as many drawers in a back to back construction, the vertical bus should have twice the conductor cross section of the bus for a single tier of drawers. One of the objects of this invention is to provide a new and improved arrangement of vertical bus bars for back to back assemblies of control centers. A more specific object is to provide an improved bus structure in which the same components can be used to make up a single tier or a back to back tier control center.

The prior art has suggested putting an insulating partition between the bus bars and the drawers of the control center; the partition has windows at standard heights for the stabs on the drawers to extend through to contact the bars. Another object of this invention is to provide a new and improved bus structure in which an insulating structure supports the vertical bus bars and also isolates the bars from people working in the control center. Another more specific object of the invention is to provide a new and improved bus structure in which the bus bars may be open along their entire length to receive stabs at any height or, in a second embodiment, to make the bus bars electrically accessible to the stabs only at standard heights.

When the bus assembly of this invention is used with a double tier control center, it has two bus bars for each phase. All six bars are spaced apart about equally so that from the top view the two tiers of drawers appear to be offset toward opposite sides of the control center. The bus bars are aligned with their front and back edges even and with their flat sides parallel, and an insulating support makes a zigzag around the six bars. The zigzag insulating structure tightly encloses half of each bar for support and leaves the other half open to receive the stabs. Thus three of the bars face one tier of drawers and the other three face the other tier. The insulating support runs about the entire height of the bars and forms insulating troughs that contain the exposed part of each bar. This trough is made wide enough on each side of the bus bar for the stabs to engage the flat sides of the bar, but it is made too narrow for a person to get his fingers in between the bus bars and the side of the trough. At least the narrow exposed front edges of the bars are insulated; in one embodiment of the invention the sides of the bars are not insulated and in another embodiment the sides are insulated except at predetermined heights where the stabs may be located on the drawers.

When the bus assembly is used with a single tier of drawers, only three bus bars are used, one for each phase. The space in the insulating support where the other three bars would have been located is filled in with a supporting strip or, equivalently, the support is formed with only three openings for the enclosed parts of the bars, all on one side.

The drawing and the description will suggest other objects and advantages of the bus bar assembly of this invention.

FIG. 1 is an isometric with parts broken away showing a motor control center with one drawer removed and with the vertical bus assembly of one embodiment of this invention.

FIG. 2 is a top view of the bus structure of FIG. 1.

FIG. 3 is an exploded view of another embodiment of the insulated bus structure of this invention.

FIG. 4 is a top view of another embodiment of the insulated bus structure of this invention.

FIG. 5 is a top view of the bus structure of FIGS. 1 and 2 modified for a control center with a single tier of drawers.

The motor control center of FIG. 1 is a tall boxlike metal structure. It has two metal sides 10 and 11 that are turned in along their vertical edges to form narrow flanges 12 along the edges of the front 13 and back 14 of the control center. (The terms front and back are arbitrary.) Flanges 12 have holes 15 that are spaced apart a predetermined interval. Spacer bars (not shown) are connected between sides 10, 11 at appropriate holes 15 to form the boundary between vertically adjacent compartments of the control center. Doors 17 are hinged to flanges 12 to cover accessible compartments, and removable panels 18 are mounted on the flanges to cover other parts of the control center. The control center has a space 19 at the top to receive a horizontal bus structure 21 through openings 22 in sides 10, 11; the horizontal bus structure comprises three conductors 23, 24, 25 and appropriate supports. Horizontal bus structure 21 extends through several motor control centers that are mounted side by side. A vertical bus structure 28 that will be described in detail later extends downward from the horizontal bus 21 to about the lower edge 29 of the lowest compartment of the control center. Side 10 has a support member 30 that extends vertically from about the lower edge of opening 22 to about line 29; side 11 has a vertically extending support member 32 that is similar to support 30 except that it is reversed as seen in a top view. This reversal makes the front and back compartments identical as seen through doors 17. Support members 30, 32 cooperate with the flanges 12 to support tracks (not shown) that guide drawers 35 in and out of some of the compartments. Each drawer 35 includes a metal plate 36 that the electrical apparatus is mounted on; it also has three stabs 38 that are mounted on an insulating assembly 39 attached to the back 40 of the drawer. Drawers 35 are mounted on one side of the compartment, and the other conductors that connect the control apparatus to the motors are lead down the space between a drawer and a side 10, 11 to a wiring trough in the space below line 29.

The simplified description of the motor control center of FIG. 1 illustrates several features of most control centers and of other electrical devices that are important in explaining the vertical bus assembly of this invention.

The vertical bus structure 28 comprises six flat bus bars, two for each phase. They are individually designated by the number of the associated horizontal bus bar 22, 23, 24 with a suffix $f$ or $b$ that indicates whether the bar connects to a front or a back drawer. Adjacent vertical bars 23$f$ and $b$, 24$f$ and $b$, and 25$f$ and $b$ are paired and with suitable bends and intermediate connecting members 45 are connected to the associated bar of horizontal bus structure 21. The six vertical bus bars are positioned with their flat sides 46 parallel and with their front and back edges 47 aligned. As FIGS. 1 and 2 show, an insulating and supporting structure 49 forms a somewhat squared zigzag around the bus bars, leaving three of the bus bars 23$b$, 24$b$, 25$b$ facing the back of the control center and the other three bars 23$f$, 24$f$, 25$f$ facing the front of the control center. Each bar has an exposed portion 50 and a portion 51 that is tightly enclosed by the insulating structure. A suitable material for insulating structure 49 is fiberglass.

Insulating structure 49 preferably is made as a single piece, but it will be analyzed in terms of individual segments of the zigzag shape as seen in FIG. 2. Insulating support 49 has six U-shaped sections 54 that fit around the enclosed portion 51 of the bus bars. Adjacent oppositely facing ends of U-shaped section 54 are joined by a bridging section 55. As FIGS. 1 and 2 illustrate insulating structure 49, the exposed portions 50 and the enclosed portions 51 of the bus bars are approximately equal in width and the connecting members 55 form an interrupted straight line from side to side. Thus the outer side surfaces 56 of the two U-shaped sections 54 of adjacent similarly facing bars (e.g., 23$b$ and 24$b$) cooperate with the adjacent surfaces 57 of the connecting section to form a rectangular trough for the exposed portion 50 of the intermediate oppositely facing bus bar (e.g., 23$f$). At either end of insulating structure 49 there is an L-shaped portion 59 extending in a front to back direction to form the outside wall of the trough of the two outermost bus bars 23$b$ and 25$f$. Adjacent outer end portion 59 the insulating structure 49 has a supporting flange 60 extending in the side to side direction. Flange 60 has holes 61 at predetermined locations. Vertical supports 30 and 32 are given corresponding holes and insulating structure 49 is mounted on vertical supports 30, 32 by suitable means such as bolts 62.

The sides 56 of the trough containing the exposed portions 50 of the bus bars are spaced far enough apart for a stab 38 to enter the trough and engage the flat sides 46 of the bus bars. However, sides 56 of the troughs are close enough together that a repairman could not accidentally reach into the trough and touch the side of the bus bar. A suitable distance between a trough side 56 and the side 46 of the bus bar is ⅜ of an inch.

The vertical edges 47 of bus bars are suitably insulated to prevent anyone from touching the outermost part of the bars. A suitable insulation is a U-shaped strip 64 of nylon attached to the bus bar by an adhesive.

FIG. 3 shows a bus structure 28 in which the exposed surface 50 of the bus bars is entirely insulated with a suitable cover 67 except at points 68 where stabs 38 are located on the drawers 35 to engage the bus bars. The spacing of the open points 68 equals the spacing between holes 15 in flanges 12 or a multiple of that spacing. Cover 67 is made of a suitable nontracking, fire retardant insulator such as an epoxy. The epoxy may be applied to the bus bar by a well known fluidized bed process.

The bus structure partially shown in FIG. 4 is somewhat like the bus assembly of FIG. 3 with its insulating cover 67 made integral with zigzag structure 49. Primes on the identifying numbers of FIG. 4 indicate components that correspond to similarly numbered components in the other figures. The insulating structure 49′ of FIG. 4 is generally similar to the structure of FIG. 2 except that it is formed with U-shaped section 70 that compliment the U-shaped sections 54′ and completely enclose the bus bar except where a section 70 has an open portion 72 (indicated by the dashed lines) for receiving a stab 38. Open portions 72 are spaced vertically along the bus bar as was explained in the description of the bus structure of FIG. 3.

The insulated bus structure of this invention can be used in a control center with only a single tier of drawers by simply omitting the bus bars 23$b$, 24$b$, 25$b$ for the back of the control center. The unused space for bus bars 23$b$, 24$b$, 25$b$ can be left empty or it can be filled with a spacer strip for rigidity; FIG. 5 shows the insulated bus structure of FIG. 2 provided with spacer strips 73 in place of bus bars 23$b$, 24$b$, 25$b$. If desired, the insulating structure 49 and the spacers 73 may be formed as one piece (but the single tier and double tiered insulating structure 49 would then not be interchangeable).

This description of the invention will suggest to those skilled in the art a variety of applicaitons for the bus structure and variations in details of construction within the scope of the claims. For example, it is possible to connect nonadjacent pairs of vertical bus bars to the horizontal bus bars; pairing vertical conductors 23$b$ and 25$f$, 24$b$ and 24$f$, and 23$f$ and 25$b$ would preserve the base rotation so that similarly wired drawers could be used front and back. It is also possible to stagger the front and back groups of bus bars so long as the U-shaped portions 54 and the bar insulation 64 or 67 or 70 cooperate to isolate the exposed portions of the bus bars and stabs 38 can properly contact the bars.

Having now particularly described and ascertained the nature of our said invention and the manner in which it is to be performed, we declare that what we claim is:

1. An insulated three phase bus structure for receiving electrical connectors at predetermined intervals along the length of the bus structure, comprising, three generally flat spaced apart longitudinally extending bus bars positioned with their flat sides parallel and with their longitudinal edges aligned in front and back planes perpendicular to the planes of said sides, a unitary insulating structure extending substantially the length of said bus bars and enclosing the three edges in said back plane and extending along and in contact with said sides toward said front plane edges sufficiently to enclose at least about half of each side of each bus for substantially the length of said bus bars, said insulating structure having in the two spaces between said bars and outward of the two outer bars four portions extending to about said front plane, said portions being spaced from the sides of said bus bars to form three troughs within which a portion of each of said bus bars extends, said troughs being wide enough for associated electrical conductors to enter the trough to contact exposed portions of the sides of a bar and narrow enough to prevent personnel from accidentally contacting the sides of the bars, and means positioned on the front edges of said bus bars to prevent personnel from contacting said front edges.

2. An insulated bus structure according to claim 1 in which said means to prevent personnel from contacting said front edges comprises a strip of insulating material attached to the front edge of each said bus bar.

3. An insulated bus structure according to claim 1 in which the space between a side of a bus bar and the side of its trough is about ⅜ inch.

4. An insulated bus structure according to claim 1 in which said means to prevent personnel from contacting said front edges comprises insulating material covering the front edges of said bars and covering said sides except at predetermined positions where electrical connections may be made.

5. An insulated bus structure according to claim 4 in which said insulating material is integral with said insulating structure.

6. An insulated three phase bus structure for receiving electrical connectors at predetermined intervals along the length of the bus structure, comprising, an insulating structure extending substantially the length of the bus structure and comprising a zigzag forming arrangement of U-shaped portions defining six spaced apart bus bar positions, alternate said U-shaped portions extending to opposite sides of a plurality of bridging members which connect said U-shaped portions and extend in a substantially straight line, three generally flat bus bars positioned in alternate of said bus bar positions with their flat sides parallel and with their longitudinal edges aligned in front and back planes perpendicular to the planes of their sides and each with its back edge and a portion of each side enclosed in one of said U-shaped portions of said insulating structure, the other of said U-shaped portions and an end portion of said insulating structure forming troughs within which the front edges and a portion of the sides of said bars extend, said troughs being wide enough for associated electrical apparatus to contact exposed portions of the sides of the bus bars but narrow enough to prevent personnel from accidentally contacting said bus bar sides, and means mounted on said front edges to prevent personnel from accidentally contacting said front edges.

7. An insulated three phase bus structure for receiving electrical connectors at predetermined intervals along the length of the bus structure, comprising, six generally flat bus bars spaced apart with their flat sides parallel and with their longitudinal edges aligned in front and back planes perpendicular to the planes of said sides, an insulating structure extending substantially the length of said bus bars and forming a zigzag having generally U-shaped portions closely fitting around the front edges and about the front half of each side of three alternate bars and around the back edges and about the back half of each side of the other of said bars, said insulating structure having portions spacing the outer sides of said U-shaped portions from the sides of adjacent bars to form a trough within which exposed portions of said bars lie, said troughs being wide enough to receive electrical connectors contacting exposed portions of said sides but narrow enough to prevent personnel from accidentally contacting said sides, the ends of said insulating structure having bends to form the outermost trough walls and to form flanges for mounting said insulating structure, and insulating means positioned on the bar edges within said troughs to prevent personnel from contacting said edges.

References Cited by the Examiner

UNITED STATES PATENTS

| | | | |
|---|---|---|---|
| 2,361,179 | 10/1944 | De Mask | 317—120 X |
| 2,946,034 | 7/1960 | Washburn | 339—22 |
| 2,966,542 | 12/1960 | Shields | 174—72 X |
| 3,042,890 | 7/1962 | Gamble et al. | 339—22 |
| 3,113,820 | 12/1963 | Norden | 174—99 X |

JOHN F. BURNS, *Primary Examiner.*

DARRELL L. CLAY, *Examiner.*